(12) United States Patent
Daidone et al.

(10) Patent No.: US 11,438,321 B2
(45) Date of Patent: Sep. 6, 2022

(54) METHOD AND APPARATUS FOR TRUST BASED AUTHENTICATION IN SDN CLUSTERING

(71) Applicant: TELEFONAKTIEBOLAGET LM ERICSSON (PUBL), Stockholm (SE)

(72) Inventors: Roberta Daidone, Pisa (IT); Stefano Orsi, Pisa (IT); Roberto Magri, Pisa (IT)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 389 days.

(21) Appl. No.: 16/060,997

(22) PCT Filed: Jan. 13, 2016

(86) PCT No.: PCT/EP2016/050526
§ 371 (c)(1),
(2) Date: Jun. 11, 2018

(87) PCT Pub. No.: WO2017/102099
PCT Pub. Date: Jun. 22, 2017

(65) Prior Publication Data
US 2018/0367521 A1    Dec. 20, 2018

(30) Foreign Application Priority Data
Dec. 19, 2015 (WO) ................ PCT/EP2015/080697

(51) Int. Cl.
*H04L 9/40* (2022.01)
*H04L 67/1042* (2022.01)
(Continued)

(52) U.S. Cl.
CPC .............. *H04L 63/08* (2013.01); *H04L 41/20* (2013.01); *H04L 67/1046* (2013.01)

(58) Field of Classification Search
CPC ...... H04L 63/08; H04L 41/20; H04L 67/1046
See application file for complete search history.

(56) References Cited

U.S. PATENT DOCUMENTS

| 10,554,700 B2 * | 2/2020 | Lattanzi .............. H04L 65/4053 |
| 2003/0182421 A1 * | 9/2003 | Faybishenko ....... H04L 67/1044 |
| | | 709/224 |

(Continued)

FOREIGN PATENT DOCUMENTS

| CN | 1863090 A | 11/2006 |
| CN | 101106503 A | 1/2008 |

(Continued)

OTHER PUBLICATIONS

S. Vasudevan, B. DeCleene, N. Immerman, J. Kurose and D. Towsley, "Leader election algorithms for wireless ad hoc networks," Proceedings DARPA Information Survivability Conference and Exposition, Washington, DC, USA, 2003, pp. 261-272 vol. 1.*

(Continued)

*Primary Examiner* — Jeffrey Nickerson
*Assistant Examiner* — Vadim Savenkov
(74) *Attorney, Agent, or Firm* — Patent Portfolio Builders PLLC

(57) ABSTRACT

A method of managing a node in a cluster of nodes in an SDN network. The method comprising receiving from the node a request to join the cluster and a list of references authenticating the node. The references are verified and if the referenced passed the verification the node is allowed to join the cluster. Then a trust level of the node is calculated based on the number of verified references, wherein a role of the node in the cluster depends on the trust level of said node.

17 Claims, 6 Drawing Sheets

(51) Int. Cl.
*H04L 41/00* (2022.01)
*H04L 67/104* (2022.01)

(56) References Cited

U.S. PATENT DOCUMENTS

| | | | |
|---|---|---|---|
| 2005/0086300 A1* | 4/2005 | Yeager | H04L 69/329 709/204 |
| 2005/0204023 A1* | 9/2005 | Bjorg | H04L 43/10 709/221 |
| 2006/0149759 A1* | 7/2006 | Bird | G06F 16/9535 |
| 2007/0208613 A1* | 9/2007 | Backer | G06F 16/9535 715/234 |
| 2008/0095183 A1* | 4/2008 | Bijwaard | H04L 12/185 370/432 |
| 2008/0209216 A1* | 8/2008 | Kelly | H04L 9/3273 713/169 |
| 2009/0064293 A1* | 3/2009 | Li | G06F 21/55 726/6 |
| 2010/0262706 A1* | 10/2010 | Rodriguez | H04L 63/105 709/229 |
| 2013/0097317 A1* | 4/2013 | Sheleheda | H04W 12/0808 709/225 |
| 2014/0301192 A1* | 10/2014 | Lee | H04L 45/586 370/230 |
| 2016/0156593 A1* | 6/2016 | Yan | H04L 9/3239 726/4 |
| 2017/0032374 A1* | 2/2017 | Doddamani | G06Q 20/4016 |
| 2017/0041354 A1* | 2/2017 | Lattanzi | H04L 65/1089 |
| 2017/0070597 A1* | 3/2017 | Bute | H04L 67/145 |
| 2017/0104845 A1* | 4/2017 | Beattie, Jr. | H04L 47/781 |

FOREIGN PATENT DOCUMENTS

| | | | | |
|---|---|---|---|---|
| CN | 101383695 A | 3/2009 | | |
| CN | 102023999 A | 4/2011 | | |
| CN | 102131193 A | 7/2011 | | |
| CN | 101374159 B | 5/2012 | | |
| CN | 102196420 B | 1/2014 | | |
| WO | 02057917 A2 | 7/2002 | | |
| WO | WO-2014092534 A1 * | 6/2014 | | G06F 21/33 |

OTHER PUBLICATIONS

Mohan Dhawan, Rishabh Poddar, Kshiteej Mahajan and Vijay Mann, "SPHINX: Detecting Security Attacks in Software-Defined Networks", Proceedings of the 22th Annual Network and Distributed System Security Symposium (NDSS 15), Feb. 2015.*
"CrossProject:Integration Group:Controller-Cluster Deployment", retrieved from the Internet on Nov. 24, 2015, https://wiki.opendaylight.org/view/CrossProject:Integration_Group:Controller-Cluster, pp. 1-7.
Christopher C. Lamb et al., "Towards Robust Trust in Software Defined Networks", 2014 IEEE Globecom Workshops, Dec. 8, 2014, pp. 166-171.
Diego Kreuiz et al., "Towards Secure and Dependable Software-Defined Networks", Hot Topics in Software Defined Networking, Aug. 16, 2013, pp. 55-60.
International Search Report and Written Opinion, dated Sep. 13, 2016, from corresponding PCT Application No. PCT/EP2016/050526.
Open Networking Foundation, "SDN Security Considerations in the Data Center", ONF Solution Brief, Oct. 8, 2013, pp. 1-12.
Office Action in corresponding/related China Application No. 201600821462 dated May 18, 2020. (All references not cited herewith have been previously made of record.).
Search Report in corresponding/related China Application No. 201600821462 dated May 18, 2020. (All references not cited herewith have been previously made of record.).

* cited by examiner

METHOD AND APPARATUS FOR TRUST BASED AUTHENTICATION IN SDN CLUSTERING

TECHNICAL FIELD

The present invention relates to Software Defined Networking (SDN), in general, and in particular to authentication and trust management in an SDN network.

BACKGROUND

Software Defined Networking (SDN) is raising new challenges and opening new perspectives in the field of network security. Clustering is a fundamental concept in SDN networks: each SDN cluster offers a specific service and it is very likely that nodes join and leave clusters many times during their lifetime. This flexibility is the guarantee for elasticity, but on the other hand poses a big challenge in terms of access control and authentication of devices that join and leave many clusters during their lifetime. Therefore one of the main challenges in this scenario is authentication in distributed networks.

OpenDaylight delegates cluster management to a supernode or Seed Node (SN) and the Primary Node (PN). The SN maintains internally a list of nodes the SN knows and it is a chosen node whose task is to introduce new nodes to the cluster. Typically, there is more than one Seed Node in a cluster. If one or more malicious nodes are made part of a cluster, they can inject false information into the cluster, which may result in disrupting the service the cluster is supposed to provide, ending up in many kinds of insider attacks. Even more damage can be done if a malicious node becomes a Primary Node or a Seed Node.

SUMMARY

Accordingly, the invention seeks to preferably mitigate, alleviate or eliminate one or more of the disadvantages mentioned above singly or in any combination.

According to a first aspect of the present invention there is provided a method of managing a first node in a cluster of nodes in an SDN network. The method comprises the steps of receiving from the first node a request to join the cluster of nodes and receiving from the first node a list of references authenticating the first node. The method further comprises verifying the references and if references provided in the list of references passed the verification allowing the first node to join the cluster of nodes. The method also comprises calculating a trust level of the first node based on the number of verified references, wherein a role of the first node in the cluster of nodes depends on the trust level of said first node.

According to a second aspect of the present invention there is provided an SDN controller adapted to manage a first node in a cluster of nodes in an SDN network. The SDN controller comprises a processor and a memory. Said memory contains instructions executable by said processor, whereby said SDN controller is operative to receive from the first node a request to join a cluster of nodes and receive from the first node a list of references authenticating the first node. The SDN controller is further operative to verify the references, allow the first node to join the cluster of nodes if references provided in the list of references passed the verification and calculate a trust level of the first node based on the number of verified references, wherein a role of the first node in the cluster of nodes depends on the trust level of said first node.

According to a third aspect of the present invention there is provided an SDN controller adapted to manage a first node in a cluster of nodes in an SDN network. The SDN controller comprises an interface, a control unit, an admission unit and a trust level calculator. The interface is for receiving from the first node a request to join a cluster of nodes and for receiving from the first node a list of references authenticating the first node. The control unit is for verifying the references and the admission unit is for allowing the first node to join the cluster of nodes if references provided in the list of references passed the verification. The trust level calculator for calculating a trust level of the first node based on the number of verified references, wherein a role of the first node in the cluster of nodes depends on the trust level of said first node.

According to a fourth aspect of the present invention there is provided a computer program configured, when run on a computer, to carry out a method as described above.

Further features of the present invention are as claimed in the dependent claims.

The present invention provides the benefit of clusters scalability, allows for establishing various levels of trust that may be mapped onto SDN cluster management in a way that can be easily implemented both as a security add-on or an embedded feature for SDN controller.

BRIEF DESCRIPTION OF THE DRAWINGS

The present invention will be understood and appreciated more fully from the following detailed description taken in conjunction with the drawings in which.

DETAILED DESCRIPTION

Figure 1A:
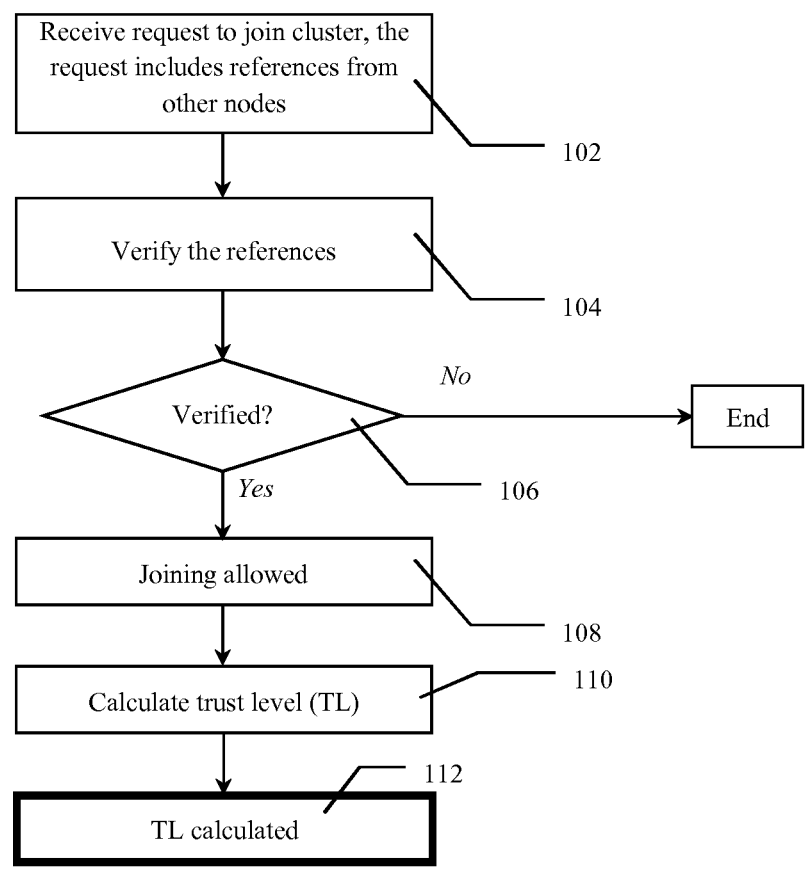
FIG. 1A is a flowchart illustrating method of managing a first node in a cluster of nodes in an SDN network in one embodiment of the present invention.

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits, and methods are omitted so as not to obscure the description of the invention with unnecessary details.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification are not necessarily all referring to the same embodiment. Further, the particular features, structures or characteristics may be combined in any suitable manner in one or more embodiments.

The following description presents and describes embodiments of the invention within an SDN cluster in accordance with the roles that are established in OpenDaylight cluster management. However, the invention in its various embodiments is also applicable to other models of cluster management in SDN networks.

The term a cluster of nodes (or simply a cluster) in this document refers to a cluster of SDN controllers providing a service (e.g. routing or application level services) and the term node, when referred to a node in an SDN cluster or a node attempting to join or leaving an SDN cluster refers to an SDN controller.

In solutions known in the art the election of a Primary Node and a Seed Node (or Seed Nodes) involves all the nodes within the cluster regardless of the trustworthiness of each node expressing a vote. No measure of trust level is present in the existing implementation. Because elections of Seed Nodes and Primary Nodes are carried out without any distinction based on trustworthiness of the candidate node and nodes voting in these elections it is possible that a malicious node can be granted a privileged position. This, in turn, makes it possible for more malicious nodes to join and take control of the cluster (collusion attack). Once the malicious node has a relevant role within the cluster, it can easily sabotage the behaviour of the whole cluster and its services.

The inventors realised that there the best countermeasure to this attack is to prevent malicious nodes from becoming part of a cluster and from getting relevant roles within the cluster and propose in this document a security enhanced solution to address SDN cluster management using a distributed and flexible authentication system that embeds policies for a secure management of the roles of the nodes within a cluster.

The proposed solution introduces the concept of trust level associated with a node in election of Seed Nodes and Primary Node in a cluster of SDN controllers. The trust level of a node (SDN controller) is established during the authentication process itself.

With reference to FIG. 1A an embodiment of a method of managing a first node in a cluster of nodes in an SDN network is illustrated. In a preferred embodiment the method starts with receiving, 102, from the first node a request to join the cluster of nodes. The method also comprises receiving a list of references authenticating the first node. In one embodiment receiving the request and receiving the list of references are two separate acts and in an alternative embodiment the request itself comprises a list of references authenticating the first node. In the following step the method comprises verifying, 104, the references. If the references provided by the first node passed the verification, 106, the first node is allowed to join the cluster, 108. In the following step a trust level of the first node is calculated 110, 112 based on the number of verified references. It is worth to note that in an alternative embodiment after the successful verification of provided references first the trust level is calculated and only then the first node is allowed to join the cluster. The calculated trust level is an important characteristic of the first node because a role of the first node in the cluster (e.g. Seed Node, Primary Node) depends on the trust level associated with said first node.

The operations described above are performed for each node joining a cluster of nodes that, preferably, operate within OpenDaylight framework. As a result each node is assigned a number representing said node's trust level. The trust level expresses the trust degree associated with a certain node in accordance with the amount of references in its list of references (reference set). The higher is the trust level of a certain node, the more trustworthy is the node and the more privileges are granted to the node.

As mentioned earlier the trust level is computed based on the reference set. The reference set is a collection of entries, which have all the same structure, but are signed by different nodes that provide the references:

$\{<$Node A, PUB$_{Node\ A}>_{reference\ ID1}$; $<$Node A, PUB$_{Node\ A}>_{reference\ ID2}$; $<$Node A, PUB$_{Node\ A}>_{reference\ ID3}\}$ In this notation Node A is the unique identifier of the first node that sent the request to join the cluster. PUB$_{Node\ A}$ is the public key of the first node. Then, $<\ >$referenceIDx represents the digital signature of the node that provided the reference to the first node. By using digital signature (i.e. $<\ >$referenceIDx) of the node providing the references a secure way of providing references is proposed. Once the pair Node A, PUB$_{Node\ A}$ is digitally signed any tampering with the values for Node A, PUB$_{Node\ A}$ will be detected and the authenticity of the digital signature can also be easily verified. An individual reference is a digital document comprising an identifier of the first node and a public key of the first node, wherein the digital document is digitally signed by an entity providing said reference.

In the example above three nodes provide references to the first node (Node A), the unique identifier of each node that provides the reference is specified as IDx.

The first node (Node A) has a certain number of references. Each reference is signed by a node that can be part of the current cluster or a node that the first node (Node A) met previously in other clusters it joined during its lifetime. In other words the list of references includes identification of nodes (SDN controllers) operating in clusters of nodes of which said first node is or was a member. The Seed Node verifies the list of nodes that signed the references of the first node against the list of nodes that signed references of the Seed Node. The nodes that signed the references of the Seed Node are the nodes that the Seed Node trusts.

In a preferred embodiment the method is implemented in an SDN controller either as a security add-on to the SDN controller or as a mechanism that is embedded in the SDN controller itself. The first option allows upgrading functionality of existing SDN controllers by adding a solution based on embodiments of the present invention as a software upgrade. This is a very efficient and inexpensive way of upgrading existing network infrastructure. The second option is for new SDN controllers that may be developed with functionality based on embodiments of the present invention built-in from the very beginning.

Figure 6:
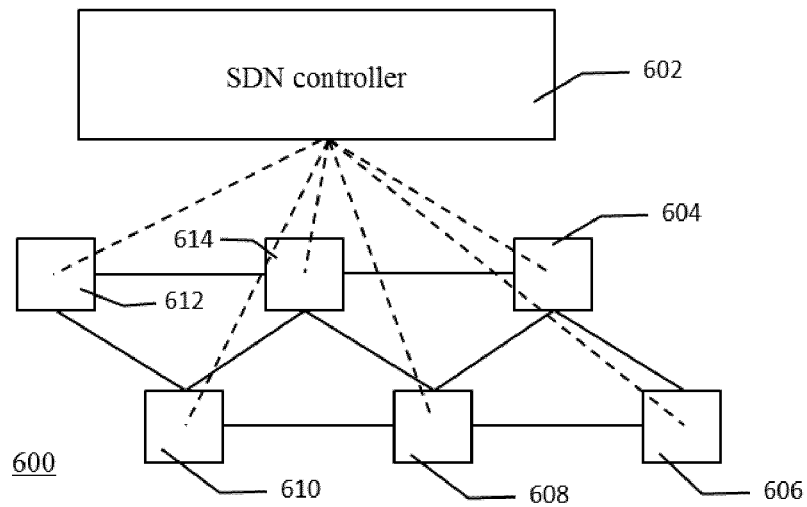
FIG. 6 is a diagram illustrating a a network of switches controlled by an SDN controller.

As shown in FIG. 6, in an SDN network 600 a centralised SDN controller 602 controls a network comprising a plurality of switches 604-614. In an SDN network all the forwarding decisions and control of the switches is done in the centralised SDN controller 602.

Figure 7:
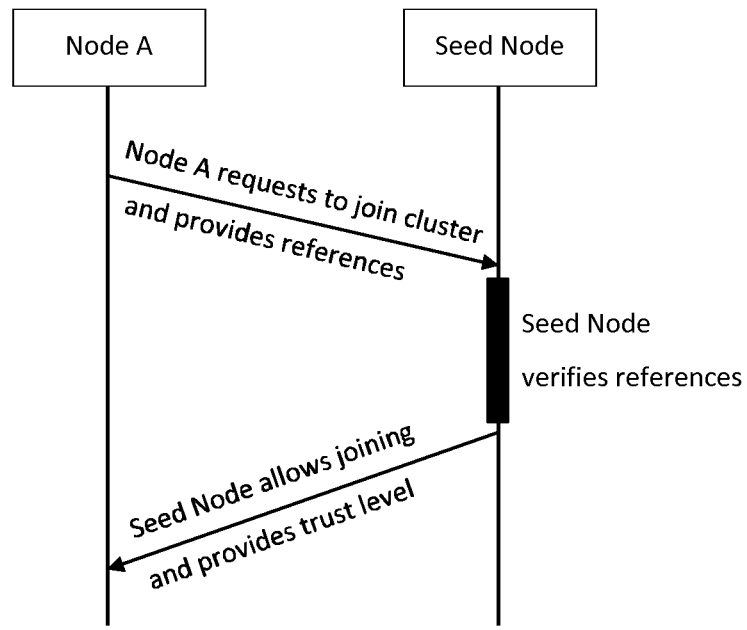
FIG. 7 is a message sequence chart illustrating exchange of messages between nodes in one embodiment of the present invention.

FIG. 7 shows an interaction between Node A and a Seed Node. A new node, Node A, joining a cluster (cluster of SDN controllers) asks the Seed Node to become part of the cluster and provides its reference set to the Seed Node. Then, the Seed Node verifies the references in the reference set provided by node A and sends back a response that determines the trust level of the node that wants to join the cluster and information that Node A may join the cluster. In an alternative embodiment two messages may be sent, one that informs Node A that it may join the cluster and another message providing the calculated trust level.

A newly deployed node starts with a trust level of zero and requests to join a cluster. In this situation the list of references comprises identification of a network operator deploying said first node in the SDN network and the Seed Node trusts it by default, e.g. the operator deploying both the Seed Node and the new node within the same cluster or another operator that has some Service Level Agreement (SLA) with the one deploying the node. This mechanism allows a newly deployed node to have at least one reference in its reference set.

Different levels of security of a cluster of nodes in the SDN network may be achieved by applying different embodiments of the present invention. In one embodiment the first node is allowed to join 108 the cluster of nodes if all references in the reference list have been verified. This means that if there is one reference in the reference list (reference set) that failed verification the node will not be allowed to join the cluster. Verification failure can be caused by different factors, for example it may be that the digital signature used to sign one of the references expired or have been tampered with, or the node that provided the reference has been removed from the network. Any of these situations would results in verification failure of a particular signature and in consequence in rejection of the request.

Alternatively, the first node is allowed to join 108 the cluster of nodes if at least one reference in the list of references has been verified. In this embodiment signatures that failed verification are ignored and only the ones that passed the verification are taken into account in allowing joining the cluster and calculating the trust level.

In yet another embodiment it may be defined a percentage or an absolute number of references that may fail verification and still result in the first node being allowed to join the cluster.

In a preferred embodiment the reference issued by the network operator deploying the first node is also verified. The verification of the reference should be performed in order to prevent giving the default trust level to nodes deployed by someone only pretending to be the network operator. Since producing such a reference would require using a private key of the network operator the verification is by checking if the digital certificate used to sign the reference is valid.

In a preferred embodiment the verification 104 of references comprises comparing digital signatures of nodes that signed the references provided by the first node with digital signatures of nodes that signed references of a Seed Node of the cluster of nodes. In one possible alternative embodiment, the verification 104 of references comprises interrogating a database of a certification authority and comparing digital signatures of nodes that signed the references provided by the first node with digital signatures of nodes stored in the database of the certification authority. More alternative methods for verifying the references can be envisaged.

In a preferred embodiment after allowing the first node to join the cluster of nodes the Seed Node of the cluster of nodes gives a reference to the first node. By joining clusters the first node receives references from the Seed Nodes of these clusters and in this way increases its the reference set size. This is advantageous because, as described earlier, the trust level of a node depends on the size of its reference list (reference set) and then the trust level of a node determines the roles that the node may perform in the cluster of nodes. As explained later in more detail, the first node may also receive references from other nodes in the cluster, for example in the process of voting in election for a Primary Node and a Seed Node (this will be described in more detail).

Once the references of the first node are positively verified and the first node is allowed to join the cluster the trust level of the first node is calculated. Although this part of the description refers to calculating the trust level after the first node is allowed to join the cluster the same operations are applicable to the alternative embodiment in which the trust level is calculated before the decision allowing joining the cluster of nodes.

As explained earlier the trust level of said first node for said cluster of nodes is calculated 110 based on the number of verified references 104. In one embodiment the trust level is computed using the following equation:

$$TL=RS-1 \qquad (1)$$

where, TL denotes Trust Level and RS denotes reference set size, or in other words the number of verified references in the reference list provided by the first node.

In calculating TL the value of RS is decreased by 1 because it is assumed that each node is deployed with the default reference from a network operator in accordance with SLA or other mechanisms that are out of the scope of our authentication solution. However, this is a convention that may be easily changed and is not an essential element of the invention.

In an alternative embodiment the trust level is calculated, 110, based on the number of verified references 104 and the size of said cluster of nodes. This embodiment is outlined in table 1 below.

TABLE 1

| Trust level | Meaning | Privileges & roles |
| --- | --- | --- |
| 0 | This is a newly deployed node. It holds only the reference of the entity that deployed it. It has never joined a cluster before. The acceptance of this certificate can be stated in SLAs between different operators or is assumed as a default within the network of the same operator | No privileges. Gains a reference from the Seed Node when joining the cluster The status of this node within the cluster is follower. Even if it is part of a cluster without a Primary Node. This node cannot become a candidate |
| 1 | This is a node that has between 1 CS/3 references which are not from the network operator that deployed it. This means the node successfully joined a number of clusters between 1 and CS/3. It has the reference of the entity which deployed it and the | It can provide the Seed Node with its reference and gains a reference from the Seed Node when joining the cluster. The node status of this node within the cluster is follower. Even if it is part of a cluster without a Primary |

TABLE 1-continued

| Trust level | Meaning | Privileges & roles |
|---|---|---|
| | reference of the Seed Node of each cluster it joined.<br>$2 \leq RS \leq CS/3$ | Node.<br>This node cannot become a candidate |
| 2 | This is a node that has more than CS/3 verified references which are not from the network operator that deployed it (i.e. successfully joined more than CS/3 clusters).<br>$CS/3 + 1 < RS$<br>(+1 in order to take into account the reference from the network operator) | It can provide the Seed Node with its reference and gains a reference from the Seed Node when joining the cluster.<br>By default this node is a follower node, but if this node is part of a cluster without Primary Node it can become a candidate and it is eligible to become a Primary Node if elected. |
| 3 | This is a node that has more than CS/2 verified references which are not from the network operator that deployed it (i.e. successfully joined more than CS/2 + 1 clusters).<br>$CS/2 + 1 < RS$<br>(+1 in order to take into account the reference from the network operator) | It can provide the Seed Node with its reference and gains a reference frome the Seed Node when joining the cluster.<br>If this node is part of a cluster without Primary Node. This node can become a candidate because it is eligible to become a Primary Node and a Seed Node as well if elected. |

CS (cluster size) in table 1 above is the number of nodes that are part of the cluster the first node is attempting to join, including Seed and Primary nodes. It is assumed that each ratio presented in the table is always rounded to the lower value.

The example presented in table 1 is just one possible embodiment and other thresholds separating the different trust levels can also be used without departing from the inventive concept of the described solution.

The roles and privileges of nodes in the cluster described in the rightmost column of table 1 are the same whether the trust level is determined based on formula (1) or based on the second column of table 1.

Using one or the other of the embodiments described above depends on the size of the network and the size of clusters. If a network is large and has large clusters it may be preferred to rely on calculating the trust level using formula (1) because it may be difficult for a node to get more than CS/3 references according the approach in table 1 and if a cluster loses its Primary Node there may not be another node in the cluster with enough references. For small and medium size clusters determination of trust level based on table 1 is a viable solution. The size of the network and clusters (large, medium or small) is implementation specific.

For a better understanding of privileges and roles of nodes in a cluster of nodes referred to in table 1 above it is important to clarify the possible roles of the nodes within a cluster as described in OpenDaylight cluster management:

Seed Node (SN) maintains a list of known nodes, it is the first contact for a new node that wants to join a cluster. It is recommended to have at least two Seed Nodes in each cluster.

Primary Node (PN): it has special functions and is pivotal in the maintenance of the cluster consistency. Please note that it is not the Seed Node.

Candidate: it is a node that is attempting to become a Primary Node.

Follower: is a node that is not primary, not seed and not candidate node; the lowest position in the hierarchy of nodes in a cluster.

Trust level TL=0 describes the situation of a newly deployed node. This node has just one reference, signed by the entity which deployed it (e.g. the network operator). In this case the Seed Node and the newly deployed node have been deployed by the same entity or by entities whose mutual trust is stated in a service level agreement (SLA). Thus, the Seed Node successfully verifies this default reference and admits the newly deployed node to the cluster. The Seed Node trusts the entity that deployed the node because the entity that signed the reference of this newly deployed node has no interest in deploying a malicious node within the cluster. In order to strengthen the security of the system in addition to the default trust based on the SLA a verification process is in place—if a third party would try and impersonate the network operator and deployed a malicious node the verification of the digital certificate used for signing the reference would reveal the attempt to breach security of the system. In this embodiment of the present invention it is assumed that the SLA states the default trust between the network operators involved in the SLA.

The other, higher, trust levels refer to the number of references gained by a node. The higher is the number of references in the reference set of the node attempting to join the cluster, the higher trust level is attributed to the node and more privileges are granted to the node. When the number of references in the reference set of a node decreases due to trust verification failures, the trust level might decrease and reduction of the privileges granted to the node will follow.

When a new cluster is deployed, some nodes must be appointed to the role of a Seed Node and a Primary Node. In this case, the nodes are deployed with the reference from the entity that deployed the nodes and references provided by members of other clusters these nodes are members (or were members in the past). Please note that the privileges constraints are met by all the clusters consisting of 3 or more nodes.

Figure 3:
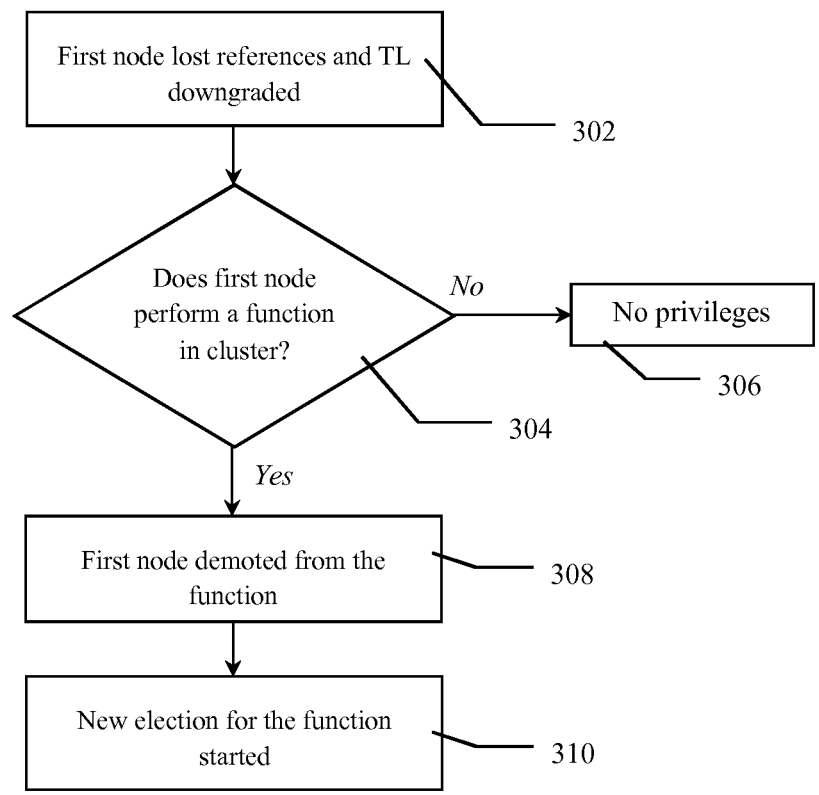

If a node that is a Primary Node or a Seed Node is downgraded to a lower level of trust, its role within the cluster falls automatically. As a consequence, it is mandatory to run a new election to appoint a new Seed Node or Primary Node. This situation is illustrated in FIG. 3. If the node has been earlier elected to a role in the cluster, 304, of nodes and later the trust level of the first node is downgraded 302 the method in a preferred embodiment comprises demoting 308 the node from the role in the cluster of nodes and starting 310 an election for the vacated role.

In one embodiment of the present invention the voting procedure takes place as follows. If Node A wants to vote for Node B we allow Node A to provide its reference to Node B. This has the beneficial side effect of increasing the trust level of the candidate node.

In the clustering management known in the art, each node that is part of a cluster can set an election timeout. The election timeout is the amount of time a follower node will stay in a cluster without a Primary Node, before becoming itself a candidate node. In a preferred embodiment of the present invention a follower node can set the election timeout if and only if it has the trust level needed to become a candidate. This embodiment provides the advantage of eliminating from the pool of nodes eligible for becoming a Primary Node or a Seed Node the nodes that have not been tested in extensive cooperation in number of clusters. In this way deploying a malicious node and promoting it to the role of a Primary or a Seed Node in a cluster will be more difficult and less likely to succeed. Moreover, the certification escalation needed to set the election timeout to become a candidate fosters exchanging references. It also prevents too many nodes from joining a single vote session, thus reducing scalability issues that are raised by the original clustering mechanism. Advantageously, this embodiment prevents a deadlock situation introduced by the original mechanism when at the first voting round each node votes for itself.

Figure 2:
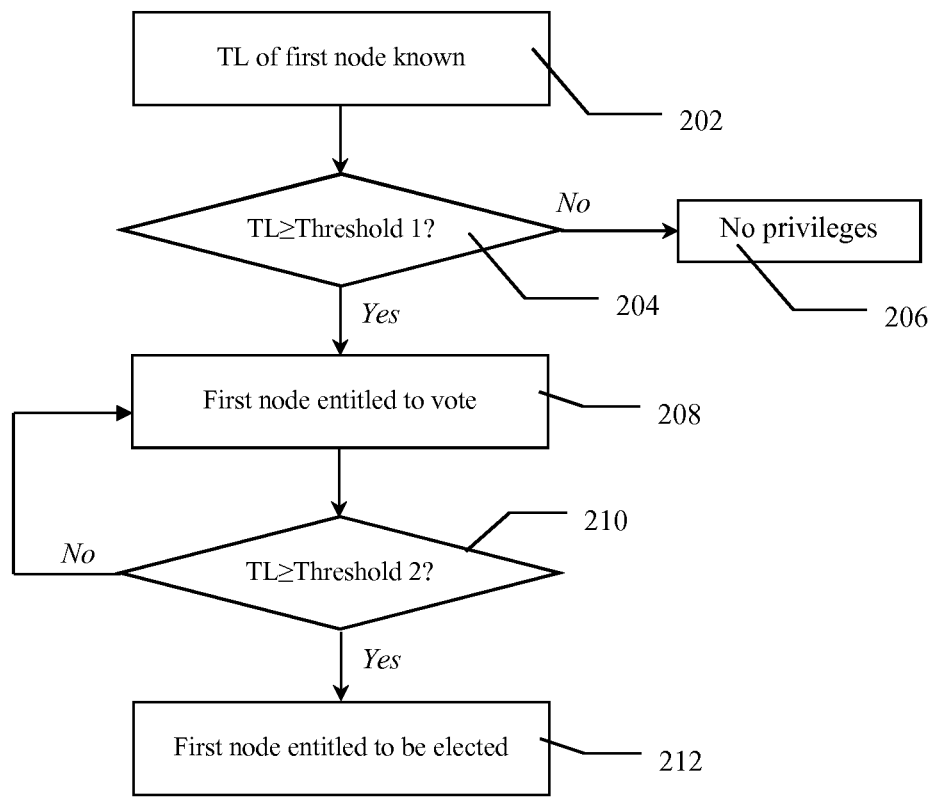
FIG. 2 and FIG. 3 are flowcharts illustrating further embodiments of the method of the present invention.

With reference to FIG. 2 one embodiment illustrating voting and election for a role in a cluster of nodes is illustrated. In this embodiment if the trust level of the first node is at or above a first threshold, 202, 204 the first node is entitled to vote, 208, to elect other nodes in the cluster of nodes for a role in the cluster of nodes. The first threshold according to table 1 is TL=1 and therefore each node having trust level (TL) 1 or above is entitled to vote. This means that if the trust level is 0 (zero) the node is not entitled to vote, 206. This simply reflects the fact that a node with TL=0 is not a yet member of any cluster, or verification of its references failed, and in consequence it should not be entitled to vote. When the trust level of a node increases also its privileges grow. Therefore, preferably, if the trust level of the first node is at or above a second threshold 210, wherein the second threshold is above the first threshold, the first node is entitled to be elected, 212, for a role in the cluster of nodes. The second threshold according to table 1 is TL=2 and therefore each node having trust level (TL) 2 or above is entitled to be elected to a role in a cluster of nodes. More specifically, in the embodiment described herein with reference to table 1 a node with TL=2 can be elected to be a Primary Node and a node with TL=3 can be elected to be a Primary Node or a Seed Node. Trust levels above 3 can also be envisaged as well as assigning specific privileges to TL>3.

The consequence of the embodiment illustrated in FIG. 2 is that the first node is allowed to set the election timeout if the first node has the trust level at or above the second threshold (i.e. TL≥2).

In alternative embodiments the thresholds proposed in table 1 may be adjusted or supplemented by additional mechanism within the cluster, for example by introducing an ageing mechanism preventing a Seed Node from remaining a Seed Node for a too long time (this is to avoid a situation where in charge of a cluster is a node whose references are provided by nodes that are not part of any cluster anymore).

Figure 1B:
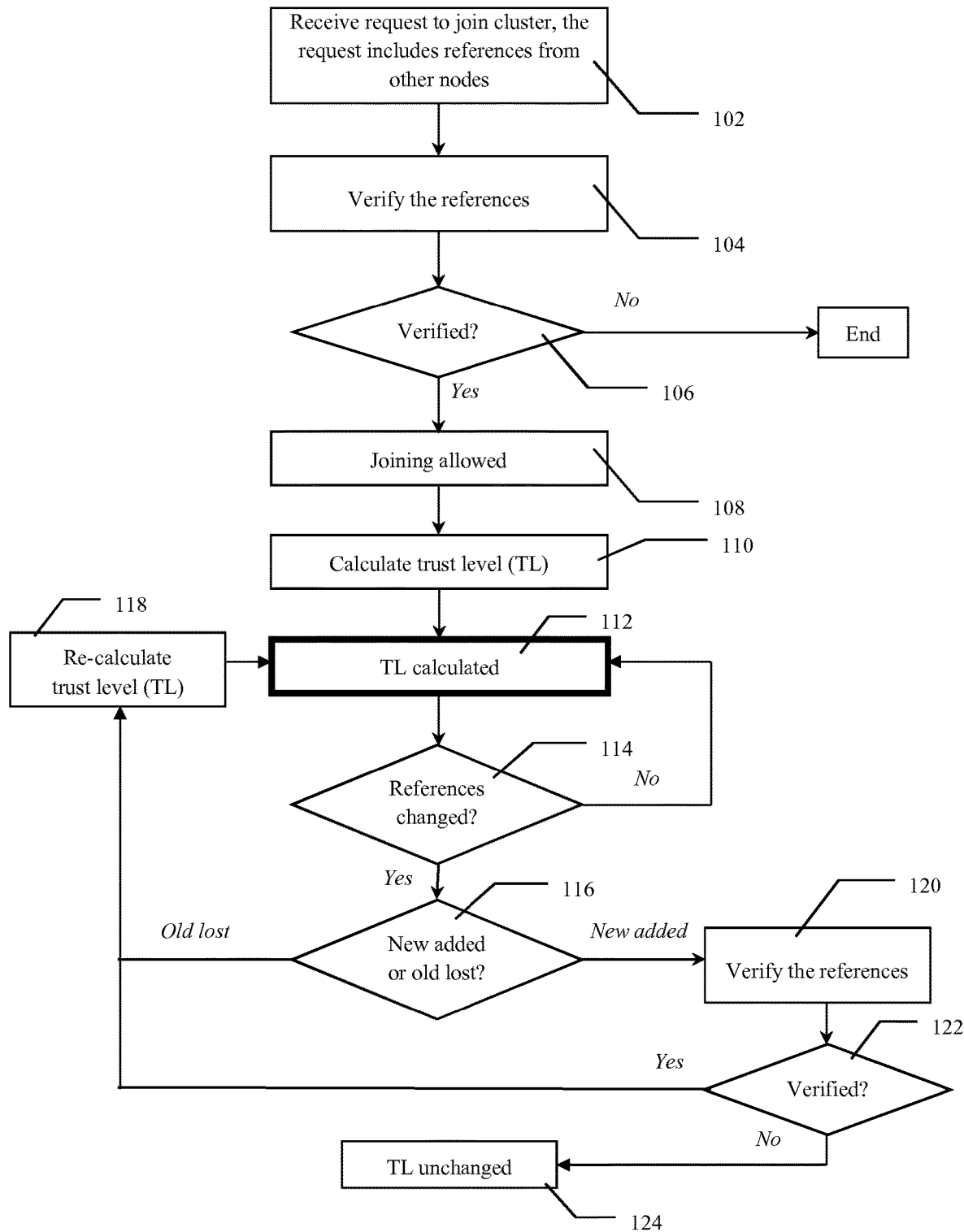
FIG. 1B is a flowchart illustrating method of managing a first node in a cluster of nodes in an SDN network in another embodiment of the present invention.

A node operating in an SDN network may join more than one cluster and in these clusters it may be entitled to vote and with the increase of its reference set size it may be entitled to be elected. This means that the size of the reference set is dynamic and this is addressed by embodiments illustrated in FIG. 1B. FIG. 1B extends the embodiment shown in FIG. 1A by introducing additional steps 114—124 described in detail below.

In a preferred embodiment the list of references the first node has might change. The change can be the result of the first node joining other clusters, receiving votes in elections for roles in clusters or by expiring of certificates of nodes that signed the earlier references. When a certificate expires, the reference cannot be verified. In this embodiment the method comprises receiving from the first node further references, 114, 116. The further references are then verified 120, 122 and the trust level is re-calculated, 118, 112, based on the number of verified references. If the newly added references fail verification and the earlier ones are not changed then the trust level remains unchanged, 124. If the reference set has been changed by removing some of the references (e.g. expiry of certificate, removal of a node from the network), see branch "Old lost" in step 116, then the method in this embodiment comprises re-calculating the trust level 118, 112. As discussed above this may lead to drop of trust level value and if the first node had a role in the cluster of nodes its role within the cluster may fall and there may be a need to start election process for the vacated role. A situation in which drop in the trust level may not result in falling out of the role in a cluster is when the trust level, despite the drop, is still above the required threshold. However, an embodiment in which any drop of trust level of a node having a role in a cluster results in removing the node from this function is also envisaged.

Figure 4:
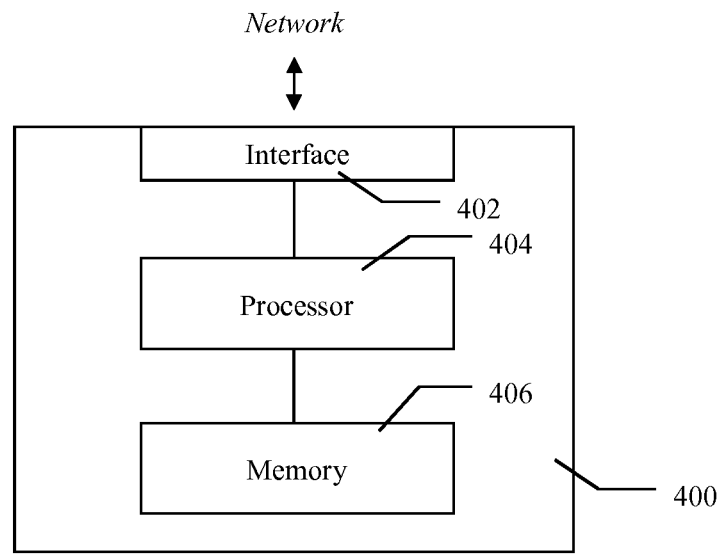
FIG. 4 is a diagram illustrating an SDN controller in one embodiment of the present invention.

With reference to FIG. 4 one embodiment of an SDN controller in accordance with the present invention is disclosed. In the following description, unless otherwise stated, it is assumed that the SDN controller operates in a cluster as a Seed Node.

The SDN controller, 400, when operating as a Seed Node in a cluster of nodes (cluster of SDN controllers), is adapted to manage a first node in a cluster of nodes in an SDN network. The SDN controller, 400, comprises a processor, 404, and a memory, 406. The memory, 406, contains instructions executable by said processor, 404. Said SDN controller, 400, is operative to receive from the first node a request to join a cluster of nodes and to receive from the first node a list of references authenticating the first node. In one embodiment the request and the list of references are received in two separate operations and in an alternative embodiment the request also comprises a list of references authenticating the first node. Said SDN controller, 400, is further operative to verify the references and to allow the first node to join the cluster of nodes if after verifying the references it is determined that the node should be allowed to join the cluster. By executing the instructions by the processor 404, the SDN controller calculates a trust level of the first node based on the number of verified references. The significance of the trust level is that a role of the first node in the cluster of nodes depends on the trust level of said first node.

The SDN controller, 400, is in general configured to operate in accordance with embodiments of the method as described earlier in this document. More specifically the operations carried out by the SDN controller, when implementing the method in accordance with embodiments of the present invention, may be divided into two groups: operations focused on calculating and keeping up to date the trust level of nodes in clusters of nodes and operations focused on election of nodes for roles in a cluster.

Calculating and Maintaining Trust Level Up to Date.

In a preferred embodiment the SDN controller, 400, operating as a Seed Node in a cluster of nodes (cluster of SDN controllers) is operative to receive from the first node further references and to verify these further references. The first node operates in the network and may become a member of another cluster of SDN controllers or even more than one cluster of SDN controllers. One of the results of joining other clusters is receiving additional references. These additional references are then reported to the SDN controller operating as the Seed Node in a cluster the first node is attempting to join. Once the additional references are verified the SDN controller re-calculates the trust level based on the number of verified references. In re-calculating the trust level all verified references are taken into account (i.e. the old ones and the additional ones too).

The network operator deploying the SDN network may decide how tight the security should be. If a very strict security policy is applied the SDN controller 400 is operative to allow the first node to join the cluster of nodes if all references in the reference list have been verified. In this embodiment if the list of references includes a plurality of references and if one of these references fails the verification the first node will not be allowed to join the cluster. In an alternative embodiment said SDN controller, 400, is operative to allow the first node to join the cluster of nodes if at least one reference in the list of references has been verified. This means that the references that failed the verification are ignored and only the ones that passed verification are taken into account.

In the process of verification of references said SDN controller operating as a Seed Node is operative to compare digital signatures of nodes that signed the references provided by the first node with digital signatures of nodes that signed references of a Seed Node of the cluster of nodes. In an alternative embodiment said SDN controller operating as a Seed Node interrogates a database of a certification authority and compares digital signatures of nodes that signed the references provided by the first node with digital signatures of nodes stored in the database of the certification authority.

The SDN controller, 400, also comprises an interface, 402, for communicating with nodes in the SDN network, for example with the first node and with other SDN controllers in the cluster, switches controlled by the SDN controller, as well as for communicating with entities not being part of the SDN network, for example the certification authority. The interface may be based on one of a number of network technologies, for example Ethernet. Other wired and wireless network technologies may also be used in alternative embodiments of the invention.

Election of Nodes for Roles in the Cluster.

As discussed earlier the trust level of a node determines the role the node is allowed to play in the cluster. If the trust level of the first node is at or above a first threshold (i.e. $TL \geq 1$ in the embodiment of the method described in table 1) the SDN controller, 400, is operative to allow the first node to vote to elect other nodes (also members of the same cluster) for a role in the cluster. If the trust level of the first node is at or above a second threshold (i.e. $TL \geq 2$ in the embodiment of the method described in table 1) the SDN controller, 400, is operative to allow the first node to be elected to a role in the cluster of nodes. The second threshold in this embodiment is higher than the first threshold.

If the first node is elected to a role in the cluster and later the trust level of the first node is downgraded the SDN controller demotes the node from the role in the cluster and starts a new election process for the vacated role.

In a preferred embodiment of the present invention the SDN controller operating as a follower node in the cluster is operative to set an election timeout if the SDN controller has the trust level needed to become a candidate. This means that the SDN controller is allowed to set an election timeout if it has the trust level at or above the second threshold ($TL \geq 2$).

In one embodiment the SDN controller calculates the trust level of said first node based on the number of verified references and the size of said cluster of nodes. More details about this embodiment can be derived from table 1 and its accompanying description.

In yet another embodiment the present invention is implemented in a computer program configured, when run on a computer, to carry out a method described above. Preferably, the computer program product comprises computer readable media having stored thereon a computer program for carrying out the method described above.

Figure 5:
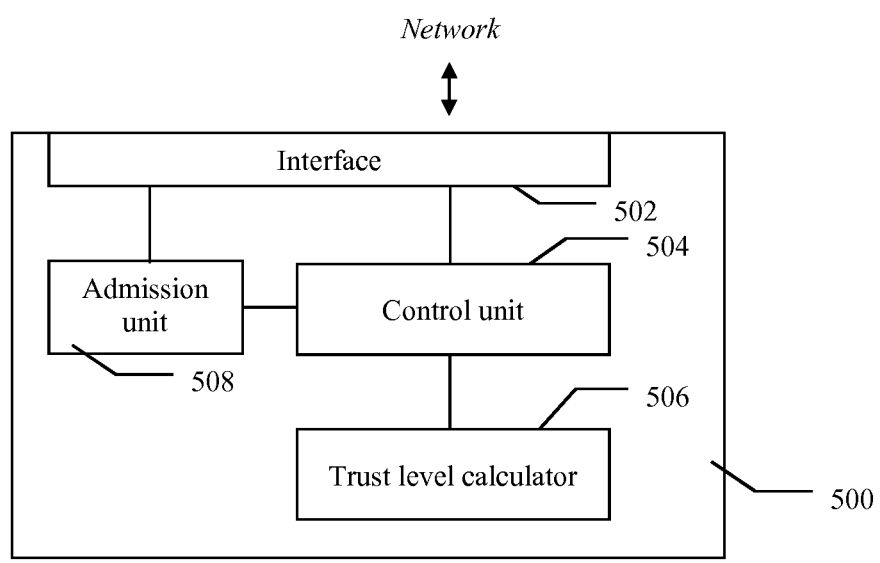
FIG. 5 is a diagram illustrating an SDN controller in an alternative embodiment of the present invention.

In yet another embodiment a network comprising a plurality of SDN controllers is herein disclosed. The SDN controllers are as described above and illustrated in FIGS. 4 and 5. An individual SDN controller provides control of network elements (e.g. switches or routers) as illustrated in FIG. 6. The SDN controllers in a network may form clusters and the SDN controllers and their trust in the cluster are managed as described in embodiments of the method of the present invention.

This document proposes a solution that solves problems related to trust level of a new node that joins an SDN cluster that in one embodiment operates within the OpenDaylight framework. The advantages of this solution are the following:

In a distributed scenario such as SDN clustering the best approach to authentication of a node is to rely on a system that is distributed within each cluster.
  The level of trust that each node can achieve is tailored to the SDN cluster management implemented in the SDN network (e.g. based on OpenDaylight). This allows assigning policies and functionalities in the cluster of controllers in a coherent manner.
  A solution based on embodiments of the present invention can be a security add-on to pre-existing clustered architectures with components from different vendors. This provides the opportunity to enhance security also in already deployed systems, with the following benefits:
  cost efficiency,
  easy deployment and maintenance,
  distributed, scalable and flexible network control.

The invention claimed is:

1. A method of managing a first node in a cluster of nodes in a Software Defined Networking, SDN, network, the method comprising the steps of:
   receiving from the first node a request to join the cluster of nodes,
   receiving from the first node a list of references authenticating the first node;
   verifying the references prior to allowing the first node to join the cluster of nodes;
     allowing the first node to join the cluster of nodes if references provided in the list of references passed the verification; and
     calculating a trust level of the first node based on the number of verified references,
     wherein a role of the first node in the cluster of nodes is determined by the trust level of said first node, wherein the first node is a Software Defined Networking, SDN, controller and each node in the cluster of nodes is a Software Defined Networking, SDN, controller, in the SDN network, wherein the references comprise identification of a network operator deploying said first node in the SDN network when the first node has a trust level of zero, wherein if the first node is elected to a role in the cluster of nodes and later the trust level of the first node is downgraded the method comprising:

demoting the first node from the role in the cluster of nodes; and starting a new election process for the role.

2. The method according to claim 1, wherein the first node is entitled to vote to elect other nodes in the cluster of nodes for a role in the cluster of nodes if the trust level of the first node is at or above a first threshold.

3. The method according to claim 2, wherein the first node is entitled to be elected for a role in the cluster of nodes if the trust level of the first node is at or above a second threshold, wherein the second threshold is above the first threshold.

4. The method according to claim 1, wherein in the process of voting to elect a node for a role in the cluster of nodes the first node votes for a second node by giving reference to the second node.

5. The method according to claim 3, wherein the first node is allowed to set an election timeout if the first node has the trust level at or above the second threshold.

6. The method according to claim 1, further comprising:
receiving from the first node further references;
verifying the further references; and
re-calculating the trust level based on the number of verified references.

7. The method according to claim 1, wherein the list of references includes identification of nodes operating in clusters of nodes of which said first node is or was a member.

8. The method according to claim 1, wherein the request comprises a list of references authenticating the first node.

9. A Software Defined Networking, SDN, controller adapted to operate in a cluster of nodes in an SDN network, the SDN controller comprising a processor and a memory, said memory containing instructions executable by said processor whereby said SDN controller is operative to:
receive from a first node a request to join the cluster of nodes;
receive from the first node a list of references authenticating the first node prior to allowing the first node to join the cluster of nodes;
verify the references;
allow the first node to join the cluster of nodes if references provided in the list of references passed the verification; and
calculate a trust level of the first node based on the number of verified references, wherein a role of the first node in the cluster of nodes is determined by the trust level of said first node, wherein the first node is a Software Defined Networking, SDN, controller and each node in the cluster of nodes is a Software Defined Networking, SDN, controller, in the SDN network, wherein the references comprise identification of a network operator deploying said first node in the SDN network when the first node has a trust level of zero, wherein if the first node is elected to a role in the cluster of nodes and later the trust level of the first node is downgraded said SDN controller is operative to:

demote the first node from the role in the cluster of nodes; and start a new election process for the role.

10. The SDN controller according to claim 9, wherein if the trust level of the first node is at or above a first threshold said SDN controller is operative to allow the first node to vote to elect other nodes in the cluster of nodes for a role in the cluster of nodes.

11. The SDN controller according to claim 10, wherein if the trust level of the first node is at or above a second threshold and the second threshold is above the first threshold said SDN controller is operative to allow the first node to be elected to a role in the cluster of nodes.

12. The SDN controller according to claim 9, further operative to:
receive from the first node further references;
verify the further references; and
re-calculate the trust level based on the number of verified references.

13. The SDN controller according to claim 9, wherein the list of references includes identification of nodes operating in clusters of nodes of which said first node is or was a member.

14. The SDN controller according to claim 9, wherein said SDN controller is operative to calculate the trust level of said first node for said cluster of nodes based on the number of verified references and the size of said cluster of nodes.

15. The SDN controller according to claim 9, wherein said SDN controller is operative to allow the first node to join the cluster of nodes if at least one reference in the list of references has been verified.

16. The SDN controller according to claim 9, wherein in the process of verification of references said SDN controller is operative to compare digital signatures of nodes that signed the references provided by the first node with digital signatures of nodes that signed references of said SDN controller.

17. A network comprising a plurality of SDN controllers as defined in claim 9.

* * * * *